United States Patent

[11] 3,608,557

[72] Inventor Thomas Evans
 Bettendorf, Iowa
[21] Appl. No. 16,416
[22] Filed Mar. 4, 1970
[45] Patented Sept. 28, 1971
[73] Assignee J. I. Case Company

[54] HARVESTING MACHINE DESLUGGING MECHANISM
 10 Claims, 6 Drawing Figs.
[52] U.S. Cl. ................................................. 130/27 AC, 146/DIG. 3
[51] Int. Cl. ................................................. A01f 12/28
[50] Field of Search ....................................... 130/27 R, 27 FC, 27 H

[56] References Cited
 UNITED STATES PATENTS
 2,376,618 5/1945 Paradise et al. ............... 130/27 AC FOREIGN PATENTS
1,186,097 2/1959 France ........................ 130/27 AC Primary Examiner—Antonio F. Guida
Attorney—Dressler, Goldsmith, Clement & Gordon ABSTRACT: A remotely controlled deslugging mechanism for removing trapped material from between a threshing cylinder and an adjacent concave of a harvesting machine. The deslugging mechanism includes a fluid ram having a cylinder pivoted about an axis laterally offset to one side and above the pivot axis of the threshing cylinder with a piston rod extending above the axis for the threshing cylinder. The threshing cylinder shaft has a ratchet wheel rotatable therewith and the piston rod has a cooperating pawl so that extension and retraction of the piston rod will cause the threshing cylinder to be rotated in a direction opposite to the normal direction of rotation to remove any "slug" of material from between the cylinder and the concave. The pawl is normally maintained in engagement with the ratchet wheel by gravity and the mechanism incorporates means for normally maintaining a pawl spaced from the ratchet wheel to accommodate normal rotation of said threshing cylinder.

PATENTED SEP 28 1971 3,608,557

Inventor:
Thomas Evans
By
Dressler, Goldsmith, Clement & Gordon
Attys

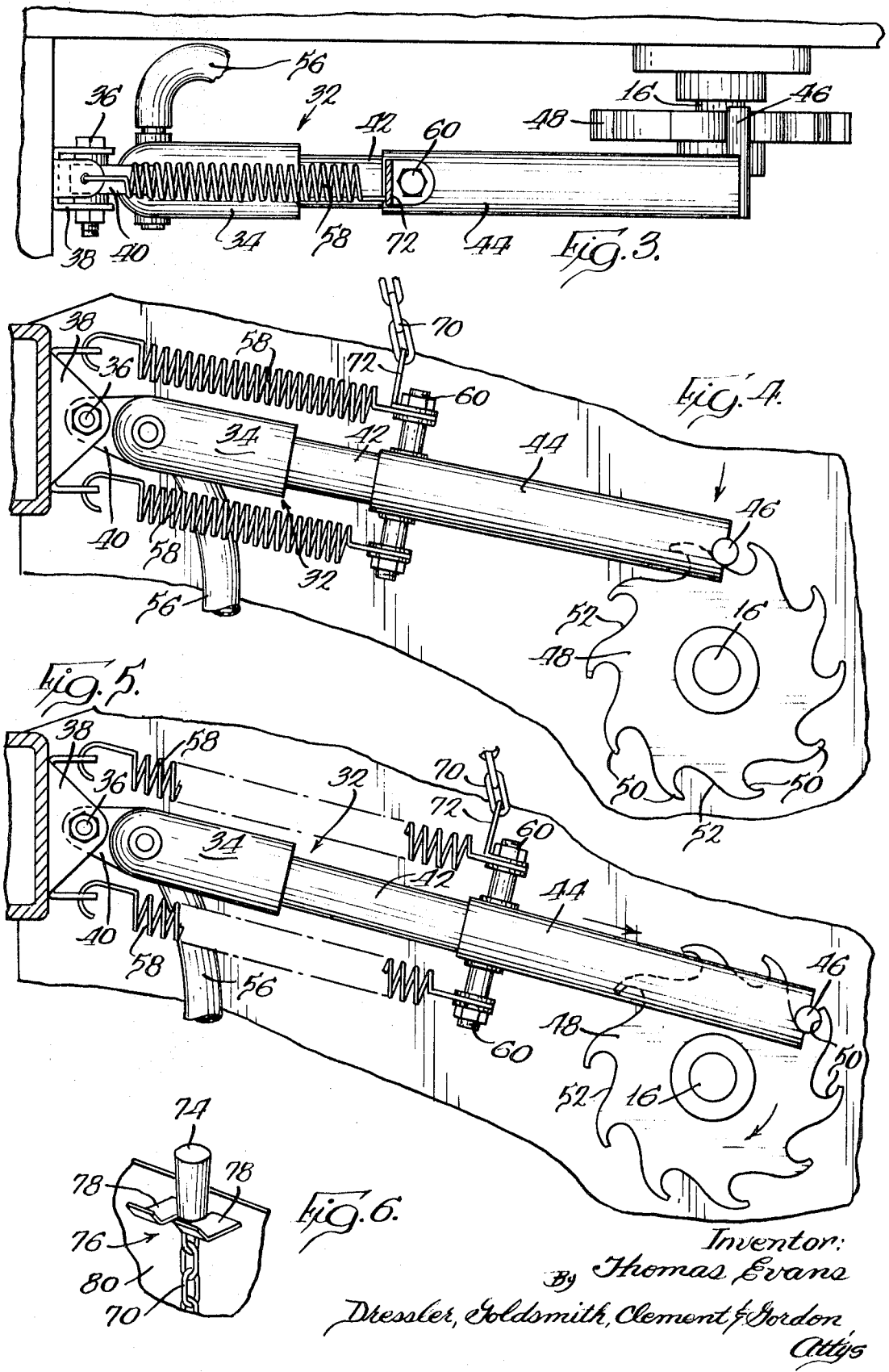

HARVESTING MACHINE DESLUGGING MECHANISM

BACKGROUND OF THE INVENTION

The present invention relates generally to harvesting machines and, more particularly, to mechanical means for removing "slugs" from such machines.

Harvesting machines, such as combines and threshers, are usually provided with a rotary threshing or crop treating cylinder, which is mounted for rotation about a fixed axis in close proximity to a stationary, adjustable curved plate, normally called a concave. The spacing between the adjacent surfaces of the threshing cylinder and the concave is generally a small radial dimension so that harvested material is scuffed or threshed by the relative action between the cylinder and concave to remove or hull the grain from the chaff.

For efficient threshing, it is particularly important that the clearance or spacing between the stationary concave and the rotating cylinder be properly adjusted because if adjusted too wide, unhulled grain is left in the straw and thereby wasted, whereas if adjusted too narrow, the kernels are broken resulting in an inferior crop harvest.

While various mechanisms have been proposed to properly adjust the optimum spacing between the concave and cylinder, difficulties have been encountered when an excessive amount of crop material, known as a "slug" enters the space suddenly and overloads the machinery, which in many instances causes the cessation of rotation of the threshing cylinder. While various types of mechanisms have been proposed for allowing the concave to be separated from the cylinder, an additional distance to allow the "slug" to be passed from between the cylinder and the concave by additional rotation of the cylinder, many times the "slug" is of sufficient size so that it may not be removed by this method. Thus, it has been conventional practice in instances of this type, for the operator to shut down the machinery and place a bar into a hole in the cylinder shaft and manually rotate the cylinder shaft in a direction opposite to the normal direction of rotation while the concave is in the lowered position.

Such an arrangement is not only annoying to the operator, since it is necessary for him to get off the operator's platform, but requires a considerable amount of time. Thus, there is a dire need for a mechanical device for removing "slugs" for trapped harvested material from between the cylinder and the concave and that the device is controlled from the operator's station.

SUMMARY OF THE INVENTION

The present invention contemplates a remotely controlled mechanism or means for rotating a threshing cylinder in a direction opposite to the normal direction of rotation so that a "slug" trapped between the threshing cylinder and an adjacent concave may readily be removed.

The remotely controlled mechanism or deslugging means of the present invention is in the form of fluid motor means having first and second elements with one of the elements pivoted about an axis spaced from the threshing cylinder and the other of the elements having a free end in juxtaposed relation to the pivot axis of the threshing cylinder. The free end of the other of the elements and the adjacent end of the cylinder have cooperating means for rotating the threshing cylinder in a direction opposite to the normal direction of rotation The counter rotation is accomplished by extension and retraction of the elements, forming part of the fluid motor means.

In the illustrated embodiment, the cooperating means is in the form of a sprocket or ratchet wheel fixed to the threshing cylinder shaft with a pawl or drive means carried by the free end of the fluid motor means to engage the teeth of the wheel and cause counterrotation of the threshing cylinder.

In its optimum embodiment, a present invention contemplates mounting the fluid motor means or cylinder and piston rod, so that the pawl is located above and normally spaced from the ratchet wheel and stored in this position. When the threshing area becomes clogged, the deslugging mechanism is released and placed in engagement by gravity for the deslugging operation. and placed BRIEF DESCRIPTION OF THE SEVERAL VIEWS OF DRAWINGS FIG. 1 is a fragmentary, perspective view of a harvesting machine having the present invention incorporated therein;

FIG. 3 is a plan view taken along lines 3—3 of FIG. 2 showing the deslugging mechanism of the present invention in its retracted position;

FIG. 4 is an enlarged fragmentary side elevation view of the deslugging mechanism in one of the operative positions;

FIG. 5 is a view similar to FIG. 4 showing the deslugging mechanism in a second operative position; and FIG. 6 is an enlarged fragmentary perspective view of a portion of the cab of the harvesting machine shown in GIG. 1.

DETAILED DESCRIPTION

Figure 1:
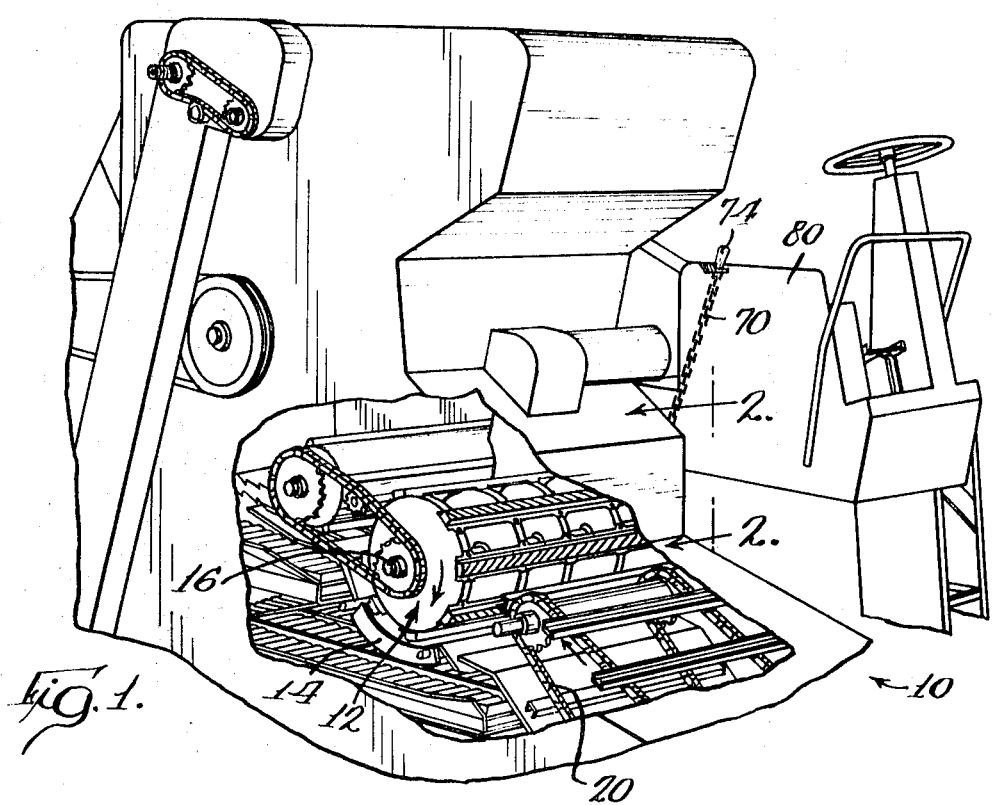
Figure 2:
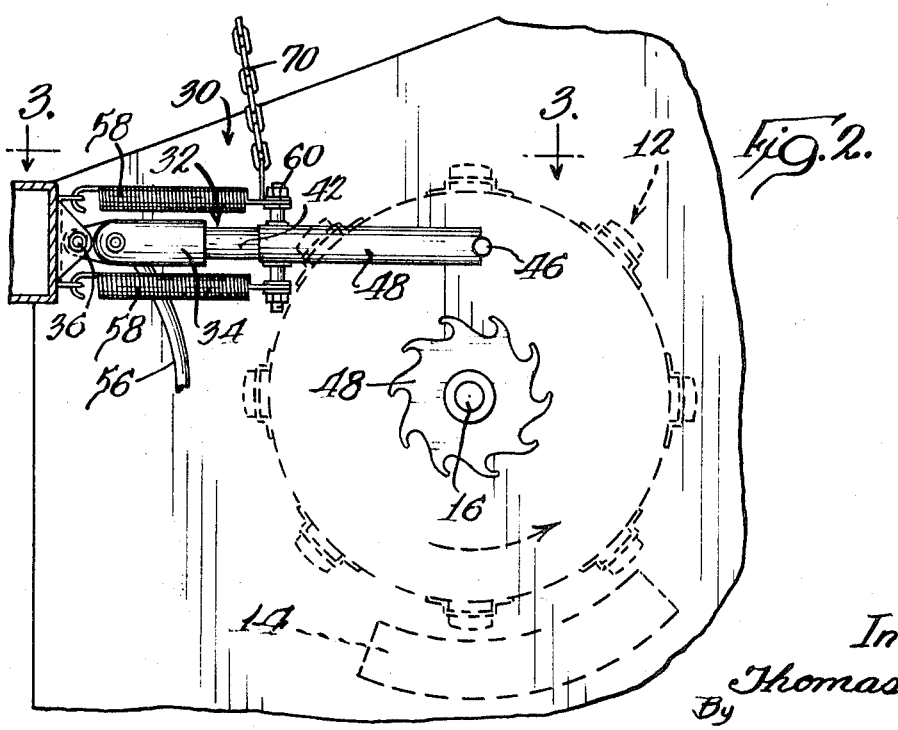
FIG. 2 is a fragmentary, side elevation view taken generally along line 2—2 of FIG. 1, showing the deslugging mechanism in its stored position.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment FIG. 1 of the drawings discloses a fragmentary perspective view of a harvesting machine, such as a combine, generally designated by the reference numeral 10. The harvesting machine includes a threshing or crop treating cylinder 12 with an arcuate concave 14 disposed below the cylinder and spaced from the peripheral surface thereof. The threshing cylinder is normally rotated about a fixed axis defined by the cylinder shaft 16 through a suitable power source (not shown) while the concave 14 is adjustable to vary the spacing between the concave and cylinder.

In the operation of the harvesting machine 10, the harvested crop is delivered by a feed rake 20 to the radial spacing or area between the concave 14 and the rotating cylinder 12 to separate the grain from the remainder of the harvested material. The operator controls the operation of T the machine from the cab or operator's station 22.

Many times, particularly when the harvested material has a certain amount of moisture content and the harvested grain is of rather heavy consistency, such as rice, there is a tendency for some of the material to be delivered from the feed rake 20 to the threshing area defined by the cylinder 12 and the concave 14 in the form of a "slug," which may cause the plugging of the combine to stop the cylinder 12. Furthermore, at other times, foreign objects, such as stones, pieces of wood or the like, may inadvertently be drawn into the mechanism and jam or prevent rotation of the threshing cylinder 12.

As was indicated above, it has been customary to release the adjusting mechanism (not shown) which supports the concave 14 to increase the spacing between the concave and the threshing cylinder. However, because of the limited space below the area of the concave and the construction of the adjusting mechanism, it may not be possible to move the concave sufficiently and allow for a sufficient expansion of the "slug" so that the "slug" will still tend to prevent rotation of the threshing cylinder, even when the concave is moved to the most remote position. In instances such as this, it has been customary for the operator to dismount from the operator station and to insert a bar into a hole in the cylinder shaft 16 to rotate the shaft in a direction opposite to the normal rotation thereof and force the "slug" forwardly sufficiently thereby allowing the material to expand and be separated for reentry into the threshing area for further processing.

In present-day agricultural operations, such a time consuming manner of correcting a malfunction is extremely undesirable Furthermore, in many harvesting machines of this type, the complexity of the machine results in considerable congestion around surrounding opposite ends of the shaft 16 for the cylinder 12. Thus, it becomes extremely difficult to insert the bar and allow sufficient room for maneuvering and getting the proper leverage required for counterrotation of the cylinder.

However, according to the present invention, all of the problems relating to deslugging of a harvesting machine are alleviated by a simple and efficient remotely controlled mechanism, which readily can be incorporated into harvesting machines presently in existence. The deslugging mechanism or means is designed to be operated from the operator's station or cab 22 while the operator remains in the seat.

The remotely controlled deslugging mechanism is shown in FIGS. 2 through 5 and is generally designated by the reference numeral 30. The deslugging mechanism is capable of rotating the threshing cylinder in a counterclockwise direction, as viewed in FIG. 2, which is opposite to the normal direction of rotation of the cylinder about its axis defined by the shaft 16. The deslugging mechanism 30 includes fluid motor means or a fluid ram 32 having a first element or fluid cylinder 34 pivoted about a fixed axis extending parallel to and laterally offset from the axis of the shaft 16. The fixed axis is defined by a bolt 36 extending through a bracket 30 with the cylinder 34 being supported on the bolt by an apertured lug 40. The fluid motor means or ram 32 further includes a second element or piston rod 42, which is extensible and retractable relative to the cylinder 34 and has a free end thereof in juxtaposed relation to the threshing cylinder shaft 16. The free end of the piston rod and an extension on the shaft 16 have cooperating means for rotating the threshing cylinder in response to extension and retraction of the piston rod relative to the cylinder 34. The cooperating means includes drive means on the free end of the piston rod in the form of an extension 44 fixedly secured to the free end of the piston rod 42 and a pawl 46 supported on the free end of the extension 44. The cooperating means further includes a ratchet or sprocket wheel 48 having a plurality of teeth 50 defined at circumferentially spaced locations thereon with the teeth being the springs exposed to and vertically aligned with the pawl 46. The respective teeth 50 are interconnected by inclined walls 52, which define camming surfaces, for a purpose which will be described hereinafter.

The deslugging mechanism or means 30 further includes means for extending and retracting the relatively movable elements 34 and 42. For this purpose, the fluid motor means or ram 32 is a single-acting or one-way ram in which the head end of the cylinder 34 is connected to a source of pressured fluid (not shown) through a conduit 56 to extend the piston rod 42 and the conduit 56 is connected to a reservoir to accommodate the retraction of the piston rod 42 by some external means. The supply of fluid is controlled by a valve (not shown). In the illustrated embodiment, the retraction of the piston rod is accomplished by biasing means in the form of a pair of springs 58 located on opposite sides of the fluid ram 32 and each having one end connected to a bolt 60 forming part of the connection between the piston rod 42 and the extension 44. The opposite ends of the springs are connected to the bracket 38. Thus, the springs or biasing means 58 normally maintain the piston rod in the retracted position relative to the cylinder 34, while a supply of pressure fluid to the head end of the fluid cylinder 34 will overcome the biasing means and move the piston rod to an extended position.

In order to accommodate normal rotation of the threshing cylinder when there is no "slug" clogging the machine. It is further desirable to provide remotely controlled means for storing the device in a position to maintain the pawl 46 and the ratchet wheel 48 spaced a sufficient distance so that the ratchet wheel can rotate freely without contacting the pawl. The remotely controlled means is preferably controlled by the operator while he is seated on the seat in the cab or operator's station.

In the illustrated embodiment, the remotely controlled means is shown as a chain 70 having one end connected to the bolt 60 through an L-shaped bracket 72 with the opposite end of the chain having a knob 74 secured thereto and disposed adjacent the operator's station of the harvesting machine. The respective links adjacent the opposite end of the chain 70 are adapted to be received in a slot 76 defined by a pair of spaced brackets 78 extending from a sidewall 80 forming part of the operator's station.

The operation of the deslugging mechanism of the present invention is believed to be apparent from the above description, but a summary of the operation will now be described. Normally, the deslugging mechanism is held in the stored position shown in FIG. 2 by having a selected link of the chain 70 received in the slot 76. In this position, the threshing cylinder 12 is capable of being rotated in a counterclockwise direction, as viewed in FIG. 2, to perform the necessary threshing operation in cooperation with the concave 14. If, for any reason, the threshing cylinder 12 becomes jammed, such as when a "slug" of material is received between the concave 14 and the threshing cylinder 12, causing a plugging of the threshing section, it is only necessary for the operator to lower the adjustable concave to its lowermost position and release the remotely controlled means or chain 70 from the recess 76. Release of the latch means will allow the fluid ram 32 (in its retracted position) to be pivoted by gravity about the pivot axis 36 which is located on one side and above the axis of the shaft 16, so that the pawl or drive means 46 will be in contacting engagement with the peripheral surface of the wheel 48. Thereafter, a supply of pressure fluid from a source (not shown) to the conduit 56 will cause the piston rod 42 to be extended, forcing the pawl or pin 46 into engagement with one of the teeth 50, thereby rotating the cylinder 12 in the direction opposite to the normal direction of rotation. When the piston rod 42 is in its fully extended position, the supply of pressure fluid is discontinued and the conduit 56 is connected to a fluid reservoir (not shown) to allow the springs 58 to automatically return the piston rod to its fully retracted position.

During the retraction of the piston rod 42, the pin 46 will slide on the inclined walls or arcuate camming surfaces 52 located between the adjacent teeth and will assume the position shown in FIG. 4 in its fully retracted position. A further supply of pressure fluid to conduit 56 will again extend the piston rod 42, causing engagement of the pawl 46 with a next adjacent tooth 50 and further rotate the threshing cylinder an additional increment. This operation is continued until the obstruction or "slug" has been removed from between the concave and the threshing cylinder. Thereafter, the deslugging mechanism is returned to its stored position (shown in FIG. 2) and the concave is returned to its operative position for further operation of the harvesting machine.

It will be appreciated that the present invention provides a simple and effective manner of mechanically removing any obstruction from between the concave and the threshing cylinder. The present device can readily be incorporated into harvesting machines presently in the field in the form of a kit supplied to the harvesting machine owner.

While the present invention has been shown in an illustrative embodiment, many parts of the deslugging mechanism could readily be modified without departing from the basic concept of the present invention. For example, the remotely controlled means for storing or normally maintaining the pawl 46 and wheel 48 spaced from each other could take the form of a solenoid having a core connected to the deslugging mechanism with the solenoid being energized to move the mechanism to a stored position. Alternatively, the remotely controlled means could be a fluid device which could in turn be operated by the selector valve (not shown) for supplying pressured fluid to and exhausting fluid from the conduit 56. For example, when the valve was turned to a deslugging position, the remotely controlled means would automatically drop the deslugging mechanism to an operative position and the deslugging mechanism would be moved to a stored or raised position when the valve was turned from the deslugging position.

Another modification which readily comes to mind is that the single acting or one-way fluid ram 32 could be replaced by a doubleaacting ram with conduits connected to opposite ends of the cylinder of the ram and the extension and retraction of the piston rod could then be completely controlled by the supply of pressure fluid to and from the cylinder.

What is claimed is:

1. In a harvesting machine having a threshing cylinder rotated in one direction about a horizontal axis and a concave supported adjacent said cylinder for separating harvesting material, the improvement of a remotely controlled mechanism for rotating said threshing cylinder in an opposite direction; said mechanism comprising a fluid cylinder having a head end pivoted about an axis laterally offset from said cylinder axis; a piston rod extensible and retractable in said piston rod; and cooperating means on said free end portion and said one end of said threshing cylinder for rotating said threshing cylinder said opposite direction in response to extension of said piston rod.

2. A harvesting machine as defined in claim 1, including the further improvement of remotely controlled means for normally maintaining said cooperating means separated sufficiently to accommodate rotation of said threshing cylinder in said one direction 3. A harvesting machine as defined in claim 1, in which said means for extending and retracting said piston rod comprises biasing means normally maintaining said piston rod in a retracted position and means for supplying pressured fluid to said head end of said fluid cylinder for overcoming said biasing means and moving said piston rod to an extended position.

4. A harvesting machine as defined in claim 1, in which said cooperating means comprises a ratchet wheel rotatable with said threshing cylinder and having a peripheral surface defining spaced teeth with inclined walls interconnecting said teeth; and a member on said free end portion for engaging said teeth during extension of said piston rod, said inclined walls defining camming surfaces accommodating relative movement between said member and said wheel during retraction of said piston rod.

5. In a harvesting machine having a rotary crop treating cylinder and a concave supported adjacent said cylinder with said cylinder rotated in one direction for separating harvested material, the improvement of remotely controlled deslugging means for removing trapped harvested material from between said cylinder and concave and comprising: a ratchet wheel supported on said cylinder; fluid motor means comprising first and second elements, one of said elements pivoted about an axis spaced from said wheel, the other of said elements having a free end in juxtaposed relation to said wheel; drive means on said free end adapted to engage the peripheral surface of said wheel; and means for extending and retracting said elements to move said drive means and engages said wheel to rotate said cylinder in an opposite direction, whereby to remove trapped material from between said cylinder and concave.

6. A harvesting machine as defined in claim 1, in which said ratchet wheel has teeth exposed to said drive means with camming surfaces between said teeth, and said five means is located above said ratchet wheel to be maintained in contacting engagement with said wheel by gravity, the further improvement of remote control means normally maintaining said drive means spaced from said wheel.

7. A harvesting machine as defined in claim 5, in which said fluid motor means comprises a one-way cylinder and piston rod defining said elements and said last means includes biasing means normally maintaining said piston rod in a retracted position.

8. In combination with a harvesting machine having a cylinder rotated about a fixed axis in a given direction and a concave supported below and spaced from the peripheral surface of said cylinder to receive harvested material therebetween; a deslugging mechanism comprising fluid motor means having a first element pivoted about an axis spaced from said cylinder and a second element extensible and retractable relative to said first element, said second element having a free end adjacent said cylinder axis; means for extending and retracting said second element relative to said first element; and cooperating means on said free end and said cylinder for rotating said cylinder in an opposite direction in response to extension and retraction of said elements.

9. The combination as defined in claim 8, in which said cooperating means includes an extension on said free end of said second element; a pawl fixed to said extension; and a wheel connected to said cylinder and having sprocket teeth exposed to and aligned with said member, said wheel having arcuate camming surfaces between said sprocket teeth accommodating relative movement of said pawl between said teeth.

10. The combination as defined in claim 9, including the further improvement of remotely controlled means normally maintaining said pawl, spaced from said wheel.

UNITED STATES PATENT OFFICE
CERTIFICATE OF CORRECTION

Patent No. __3,608,557__   Dated __September 28, 1971__

Inventor(s) __Thomas Evans__

It is certified that error appears in the above-identified patent and that said Letters Patent are hereby corrected as shown below:

Column 1, line 64, there should be a period after "rotation".

Column 2, line 3, delete "and placed" and "Brief Description of the Several Views of Drawings" should be a center heading.

Column 2, line 18, "Gig 1" should be "Fig 1".

Column 2, line 27, add "illustrated." after "embodiment".

Column 2, line 43, delete "T".

Column 3, line 24, "30" should be "38".

Column 3, line 39 delete "the springs".

Column 3, line 65, "machine. It is" should be "machine, it is".

Column 5, line 3, "doubleaacting" should be "double-acting". same column 5, line 16, -- fluid cylinder, said piston rod having a free end portion disposed above said threshing cylinder axis adjacent one end of said threshing cylinder; means for extending and retracting said --; should be inserted after line 15;

Column 5, line 18, insert "in" after "cylinder".

Column 6, line 7, "engages" should be "engage".

Column 6, line 12, "five means" should be "drive means".

Signed and sealed this 6th day of June 1972.

(SEAL)
Attest:

EDWARD M. FLETCHER, JR.
Attesting Officer

ROBERT GOTTSCHALK
Commissioner of Patents